United States Patent [19]
Kadereit

[11] Patent Number: 5,918,714
[45] Date of Patent: Jul. 6, 1999

[54] RATCHET MECHANISM FOR DRIVING ADJUSTMENT DEVICES FOR VEHICLE SEATS

[75] Inventor: Lutz Kadereit, Wermelskirechen, Germany

[73] Assignee: Keiper Recaro GmbH & Co., Remscheid, Germany

[21] Appl. No.: 08/541,723

[22] Filed: Oct. 10, 1995

[30] Foreign Application Priority Data

Oct. 10, 1994 [DE] Germany .............................. 44 36 096

[51] Int. Cl.⁶ .............................. B60N 2/02; F16D 67/02
[52] U.S. Cl. .............................. 192/15; 74/142; 74/143; 192/19; 297/362
[58] Field of Search .............................. 192/7, 8 R, 43.1, 192/15, 19, 223; 74/143, 142; 297/362, 361.1, 354.1

[56] References Cited

U.S. PATENT DOCUMENTS

| | | | |
|---|---|---|---|
| 473,501 | 4/1892 | Fisher | 74/143 X |
| 1,175,471 | 3/1916 | Pheanis | 74/143 |
| 2,138,331 | 11/1938 | Ward | 192/43.1 |
| 2,395,576 | 2/1946 | Moroney | 192/43.1 |
| 2,978,081 | 4/1961 | Lundin | 192/43.1 |
| 4,143,905 | 3/1979 | Hensel et al. | 297/362 X |
| 4,805,481 | 2/1989 | Bauer et al. | 74/143 X |

FOREIGN PATENT DOCUMENTS

| | | |
|---|---|---|
| 31 15 942 | 11/1982 | Germany . |
| 3115942 A1 | 11/1982 | Germany . |
| 3715726 C2 | 12/1988 | Germany . |
| 37 15 726 | 11/1989 | Germany . |

*Primary Examiner*—Rodney H. Bonck
*Attorney, Agent, or Firm*—Blank Rome Comisky & McCauley LLP

[57] ABSTRACT

For a ratchet mechanism for driving adjustment devices for vehicle seats, in particular motor vehicle seats, with a control lever (4) that can be swivelled back and forth and a ratchet (6) movable by this, which cooperates with a gear ring (3) of a driven gear (1), a gear connection is provided between the control lever (4) and the ratchet (6) which engages the ratchet (6) necessarily with the gear ring (3) in an initial area of the swivelling movement of the control lever (4). Only with further swivelling movement of the control lever (4) does the ratchet (6) move on a track about the rotational axis of the driven gear (1) while positively carrying the same. Also the control lever (4) lifts the ratchet (6) from the gear ring (3) necessarily in the starting area of the isle return stroke movement of the control lever (4).

10 Claims, 4 Drawing Sheets

RATCHET MECHANISM FOR DRIVING ADJUSTMENT DEVICES FOR VEHICLE SEATS

BACKGROUND OF THE INVENTION

The invention relates to a ratchet mechanism for driving adjustment devices for vehicle seats, in particular motor vehicle seats.

In conventional ratchet mechanisms of this type, the ratchet is coupled to the control lever and spring loaded such that it remains in position on the sawtooth-shaped teeth of the driven gear. Since with such ratchet mechanisms, the driven gear can only be driven in one rotational direction, a second gear ring or a second driven gear and a second ratchet must be provided when a drive is required in both directions, which significantly increases the expenditure and the space requirement. Additionally, the driven gear can only be turned by one or more teeth, that is to say not infinitely invariably. Finally, the noise that occurs when the ratchet falls into the teeth spaces is often disruptive. There is therefore a need for ratchet mechanisms for use in driving adjustment devices for motor vehicles that overcome the disadvantages of the conventional devices.

OBJECTS AND SUMMARY OF THE PRESENT INVENTION

A primary object of the present invention is to provide a ratchet mechanism which makes infinitely variable driving of an adjustment device for vehicle seats possible and has a simple, space-saving construction. Another object of the present invention is to overcome the deficiencies of the prior art. Other objects and advantages will become apparent from the description and drawings which follow.

By engaging the ratchet with the gear ring of the driven gear practically by means of the control lever in the beginning range of its swivelling motion, the tooth of the ratchet can be engaged with the gear ring when it is not oriented first on one of the tooth spaces of the gear wheel. Thus, the driven gear cannot only be turned by the angle of a tooth of the gear ring or a multiple of this angle, but also infinitely variably. Catching noises do not occur, because the ratchet is engaged and disengaged with the toothing with the motion of the control lever and is not slid over the teeth of the toothing. It is further advantageous that due to the positive transmission of the driving rotational momentum from the control lever to the driven gear, the ratchet mechanism in accordance with the invention is not sensitive to dirt. Also, it is not sensitive to tolerances of the individual components and has a low space requirement.

For a selectable rotational movement of the driven gear in the one or the other rotational direction, no second ratchet is required if, as is the case for a preferred embodiment of the case, one provides the ratchet with two sets of teeth pointing toward the gear ring in both swivelling directions, from which the one engages with the gear ring with a motion of the control lever from a middle position to one direction and the other engages with the gear ring with a motion of the control lever from a middle position to the other direction.

The necessary movement of the ratchet in its effective position by means of the control lever can then be realized in a simple manner when a carrier element couples the ratchet with the control lever at a distance from the swivelling axis of the ratchet as well as from the swivelling axis of the control lever. If the carrier element is arranged between the swivelling axis of the control lever and of the ratchet, then the ratchet only executes a swivelling movement which opposes the swivelling movement of the control lever until it is engaged with the toothing. Then it transmits the rotational momentum of the control lever to the driven gear. The carrier element is advantageously formed by a cog parallel to the swivelling axis provided on one of the parts coupled together, which is engaged with a slot in the other part.

In a preferred embodiment, the ratchet is coupled to one and the control lever is coupled to the other arm of a double-armed swivelling lever, which is positioned swivelably on a driven shaft bearing the driven gear. The coupling point of the control lever defines the axis about which the control lever is swivelled, until the ratchet is completely engaged with the toothing of the driven gear. Through this it is achieved in a simple manner that in the beginning range of the swivelling movement of the control lever, only the ratchet is swivelled into the engaged position and the double-armed lever is only subsequently carried along by the control lever, whereby the ratchet together with its coupling point is moved on a circular track about the rotational axis of the driven gear and thus transmits the drive momentum to this positively.

The double-armed swivelling lever includes cogs arranged diametrically to its swivelling axis, which are conducted in each slot concentric to the rotational axis of the driven gear, through which the swivelling range of the control lever is limited. Advantageously, both of these cogs serve the coupling of the control lever and the ratchet on the double-armed swivelling lever. When driving, the driven gear is moveable in both rotational directions, and thus the control lever must be swivelled from a middle position into one or the other direction. Thus, a spring is provided which holds the control lever in its starting position. Preferably, a tensioned spring holds the swivelling lever in its starting position until the ratchet is completely engaged with the toothing of the driven gear and returns it to the starting position after being carrier by the control lever. The ratchet is returned to the starting position by a spring as well. The spring can be that which seeks to hold the control lever in the starting or middle position.

BRIEF DESCRIPTION OF THE INVENTION

The present invention is described in more detail with the help of two exemplary embodiments depicted in the drawings, wherein.

DETAILED DESCRIPTION OF THE INVENTION

Figure 1:
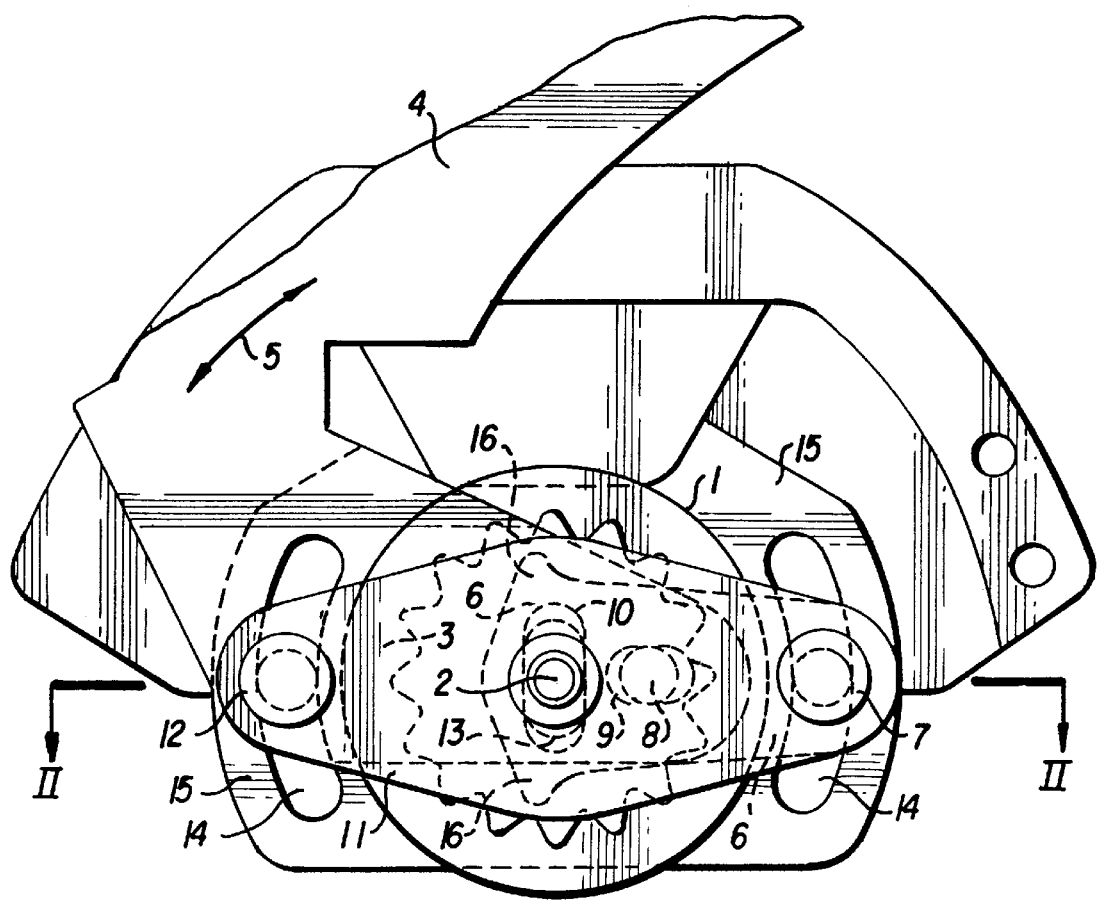
FIG. 1 is an incomplete top view of the first exemplary embodiment with the position of the control lever in the middle position.

Referring now to the drawings wherein the same numbers are used for the same element throughout the several views, there is shown in FIG. 1 a first embodiment of the ratchet mechanism of the present invention. The ratchet mechanism for driving an adjustment device of a motor vehicle seat, for example, the adjustment device for the tilting adjustment of the seat back, has a driven gear 1, designed as a bell-shaped ring gear, and arranged on a driven shaft 2 so that it cannot turn. Driven gear 1 is provided with an inner toothing 3 and is rotated by means of a manually operational, rotationally positioned control lever 4, which can be swivelled in both rotational directions, as is indicated by the double arrow 5.

Between the rotationally positioned end section of the control lever 4 and the driven gear 1, a ratchet 6 is arranged, which can be swivelled about a coupling cog 7 parallel to the driven shaft 2. As is shown in FIG. 1, the coupling cog 7 is situated radially outside the driven gear 1 and the rotatably positioned end section of the control lever 4.

Between the coupling cog 7 and the driven shaft 2, the ratchet 6 is provided with a carrier cog 8 parallel to the coupling cog 7, which engages without play in the swivelling direction of the control lever 4 in a slot 9 of the control lever 4, which slot runs radially in reference to the driven shaft 2. The ratchet 6 is moving in the swivelling direction, forcing the slot 10 to move in the same direction. The slot 13, followed by slot 10, is moving in the same swivelling direction, allowing the driven shaft 2 to pass through the ratchet 6 and to control lever 4 without hindering of the swivelling ability of said control lever 4.

The coupling cog 7 flexibly connects the ratchet 6 with the one arm of a double-armed swivelling lever 11, which is positioned rotatably next to side of the control lever 4 facing away from the ratchet 6 on the driven shaft and is secured against shifting on the driven shaft 2 in the axial direction. A positioning pin 12 arranged diametrically to the coupling cog 7 and, like this, running parallel to the driven shaft 2, serves the swivelable positioning of the control lever 4 and is connected like the coupling cog 7 with the double-armed swivelling lever 11.

The coupling lever 7 and the positioning pin 12 each engage in a slot 14 concentric to the driven shaft 2. These two slots 14 are provided in a support 15 which carries the ratchet mechanism.

As FIGS. 1 to 4 show, the ratchet 6 has on the end section provided with the slot 10 for the passage of the driven shaft 2, two opposingly arranged teeth 16 pointed away from the slot 10, which are designed the same and oriented toward the inner toothing 3. The teeth 16 are thus off-set from the plane of the remaining part of the ratchet 6 in the axial direction of the driven shaft like the end section positioned on the coupling cog 7. For this, for example, the two end sections could be doubly off-set toward the adjacent middle section.

Figure 2:
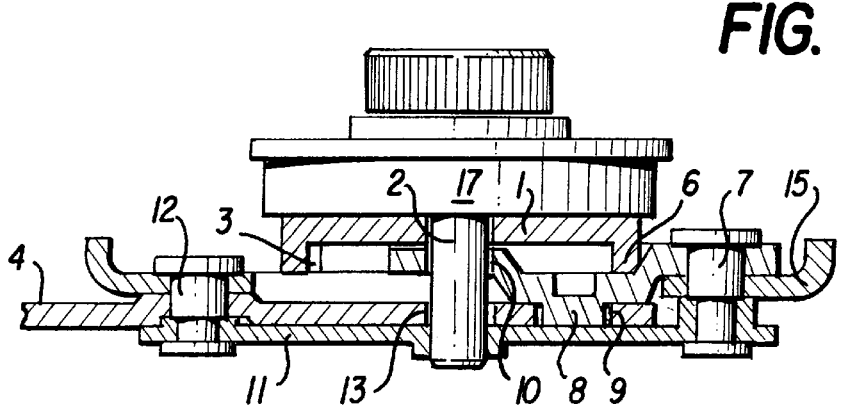
FIG. 2 is a sectional view of the first embodiment taken along Line II—II of FIG. 1.

When the driven shaft 2, for instance, is to be turned in the clockwise direction in the direction of the view in FIG. 1, the control lever 4 is swivelled in the same rotational direction about the positioning pin 12, because a tensioned spring (not shown) seeks to hold the swivelling lever 11 in its starting position as depicted in FIG. 1. During this initial swivelling movement about the positioning pin 12, the ratchet 6 is swivelled by the carrier cog 8 about the coupling cog 7 in the counterclockwise direction until the tooth 16 pointing downward in the exemplary embodiment is completely engaged with the tooth space in the inner toothing 3. Only when the tooth 16 meets one of the teeth of the inner toothing will the ratchet 6, the control lever 11 and the control lever 4 be turned about the driven shaft 2 as far in the swivelling direction of the control lever 4 as until the tooth 16 has reached the base of the tooth space as is shown in FIG. 2.

Figure 3:
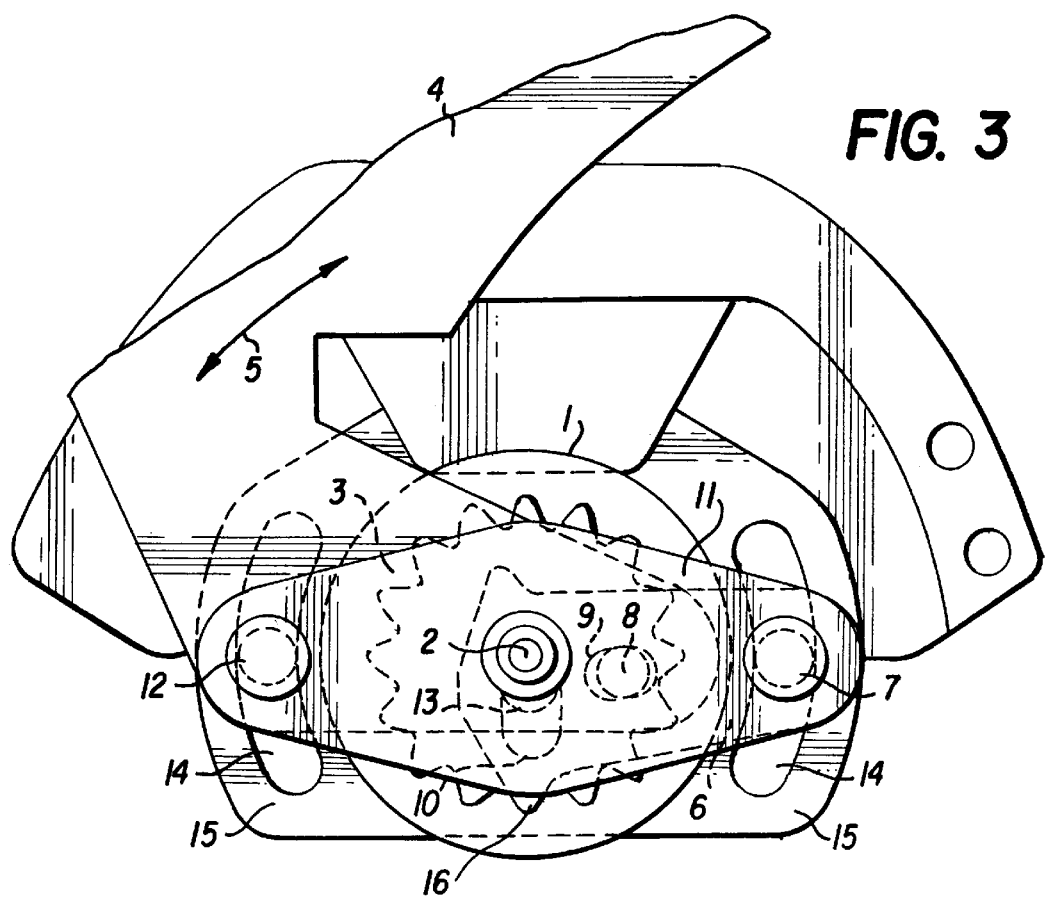
FIG. 3 is an incomplete top view of the first exemplary embodiment with the position of the control lever at the end of the starting area.
Figure 4:
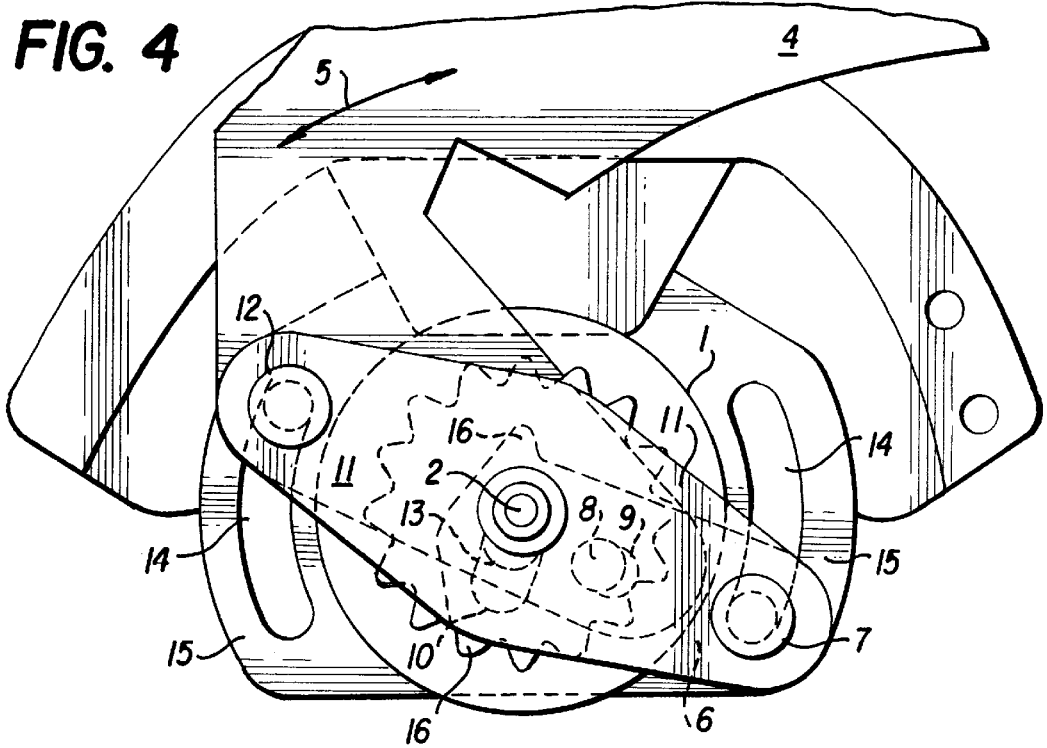
FIG. 4 is an incomplete top view of the first exemplary embodiment with the position of the control lever at one end of the swivelling range.

Therefore, the driven gear 1 is not turned in the starting area of the swivelling movement of the control lever 4. With the farther swivelling movement of the control lever 4 in the clockwise direction about the driven shaft 2, driven gear 1 is carried along by the ratchet as is shown in FIG. 3. Tooth 16 is engaged with the inner toothing 3 and moves on a track concentric to the driven shaft 2, which means that the swivelling movement of the control lever 4 is transmitted positively over the ratchet 6 to the driven gear 1. With this swivelling movement of the control lever 4, the coupling cog and the positioning pin 12 move into the slot 14. The swivelling range of the control lever 4 is limited by the slot 14.

In each desired swivelling position of the control lever 4, its swivelling can be ended, whereas the drive gear 1 can be turned infinitely variably. The maximum swivelling angle of the control lever 4 about the driven shaft 2 is limited preferably to an angle by the slot 14 which is divisible integrally by the angular pitch of the inner toothing 3.

For the return of the control lever 4 to the starting position depicted in FIG. 1, which is supported by a spring which is not depicted. The double-armed swivelling lever 11 does not participate in this opposing swivelling movement. Rather, during this initial return stroke of the control lever 4, the ratchet 6 is lifted completely out of the inner toothing 3. Then, the double-armed swivelling lever 11 is swivelled back by a tensioned pull-back spring (not shown) and the ratchet is swivelled back by the control lever 4 into the starting position depicted in FIG. 1.

Figure 5:
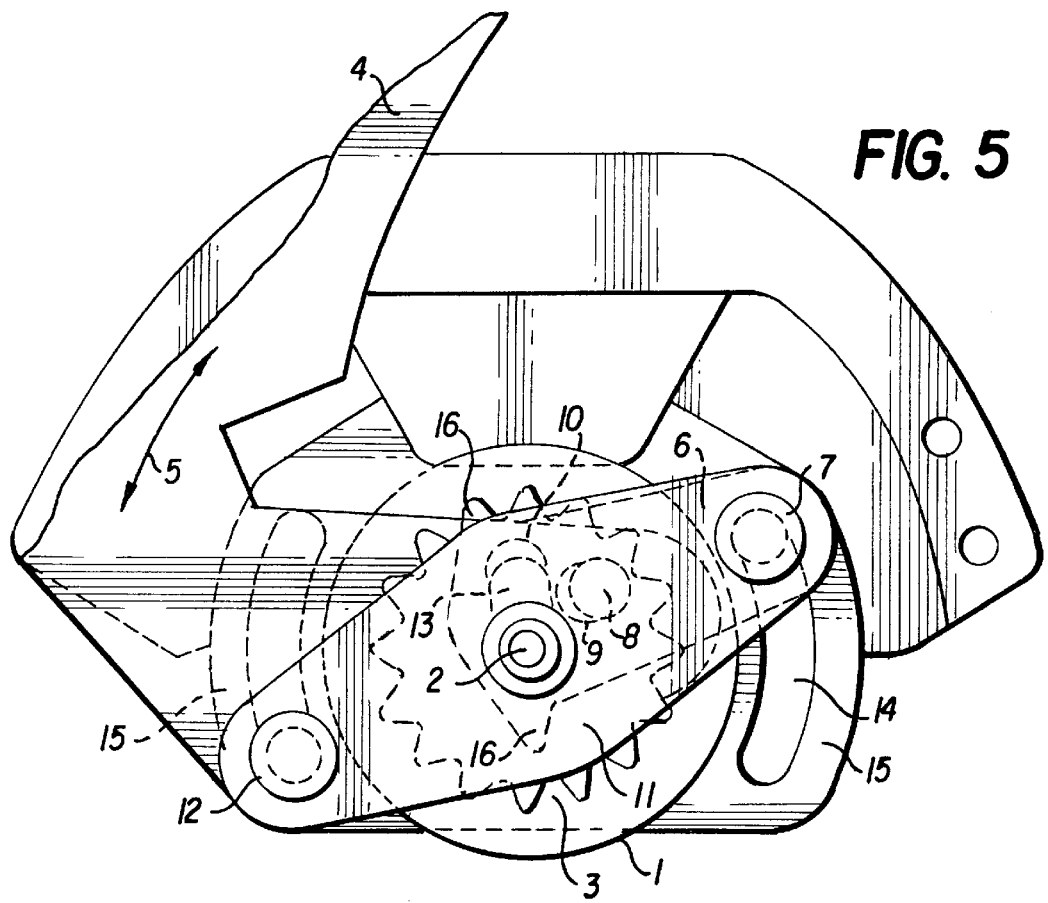
FIG. 5 is an incomplete top view of the first exemplary embodiment with the position of the control lever at the other end of the swivelling range.

If the control lever 4 is swivelled from the starting position in the counterclockwise position in the direction of the view in accordance with FIG. 1, for example, into the position depicted in FIG. 5, the tooth 16 of the ratchet 6 pointing upward is first engaged with the inner toothing 3. Then, the double-armed swivelling lever 11 and the tooth, engaged with the inner toothing 3, are swivelled about the driven shaft 2. Here as well, one can end the swivelling movement in any swivelled position of the control lever 4 and return the ratchet 6 to the starting position, whereas in this rotational direction, an infinitely variable drive of the driven shaft 2 is possible.

When the adjustment device to be driven by the ratchet mechanism is continually loaded and is not self-restraining, it is necessary to couple the ratchet mechanism with the adjustment device over a locking mechanism or a brake, because the ratchet mechanism is not in the position for such a securance. In the exemplary embodiment, the driven shaft 2 is therefore coupled with a locking mechanism 17 which is effective in both rotational directions and only releasable by turning the driven shaft 2.

Figure 6:
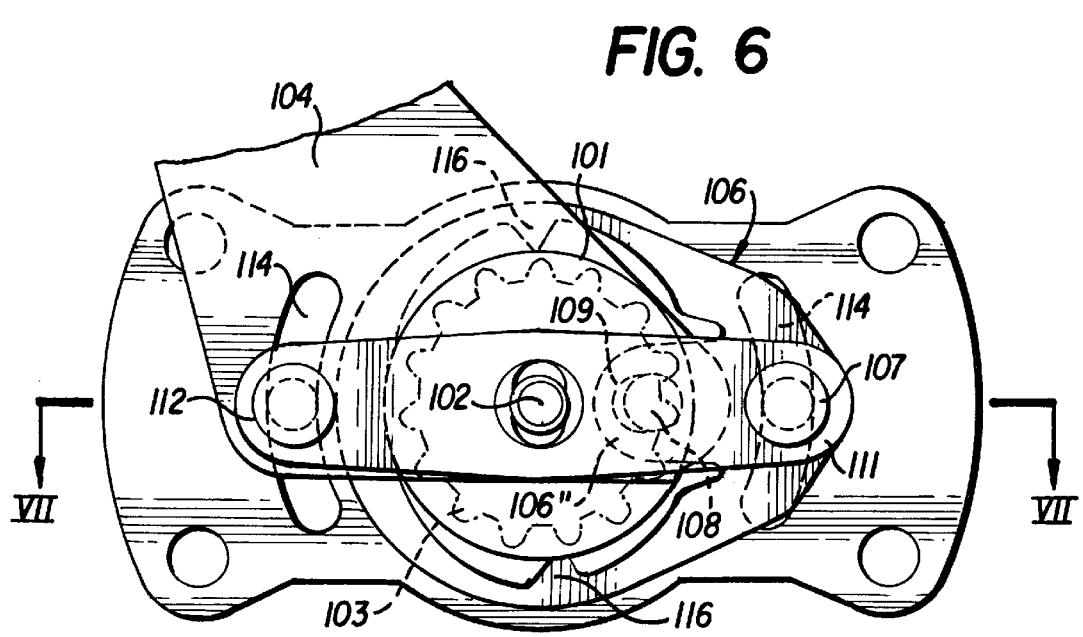
FIG. 6 is a top view of the second exemplary embodiment in accordance with FIG. 1.
Figure 7:
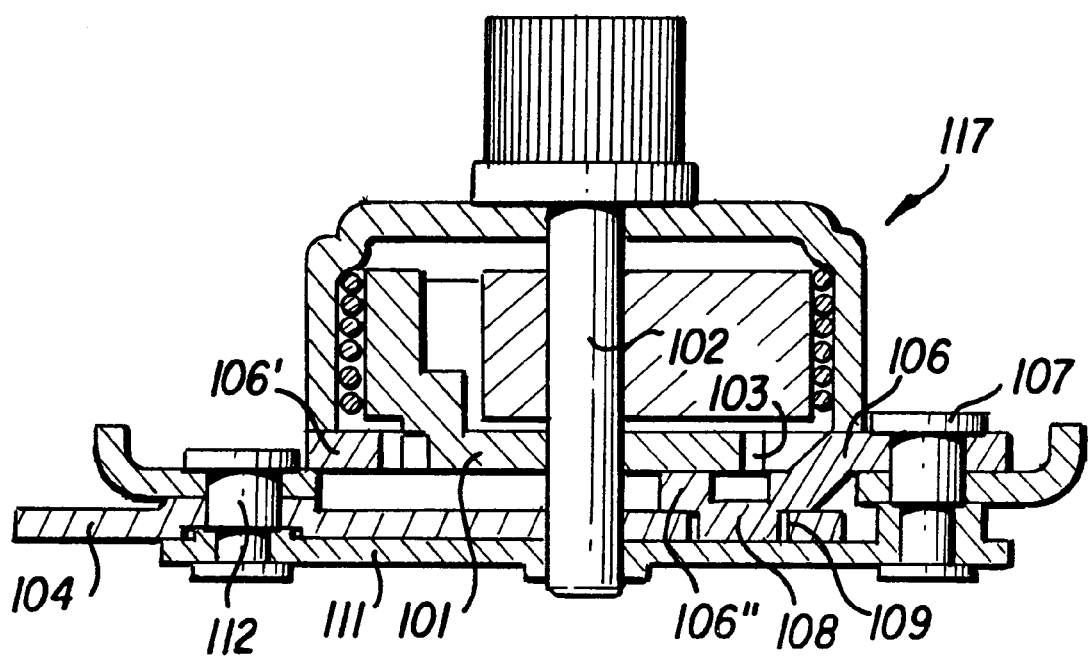
FIG. 7 is a sectional view of the second embodiment taken along Line VII—VII of FIG. 6.

The second exemplary embodiment of a ratchet mechanism for driving an adjustment device of a motor vehicle seat in accordance with the invention depicted in FIG. 6 and 7 differs from the first exemplary embodiment largely only in that the gear ring with which the ratchet cooperates is formed by an outer toothing of the driven gear. Thus corresponding parts of the second exemplary embodiment are characterized with reference numbers greater by 100 than those of the first embodiment.

The driven gear 101 connected with the driven shaft 102 such that it can not turn is provided with the outer toothing 103. The ratchet 106 lying in the same plane as the driven gear 101 has an end section 106' including the driven gear 101 at a distance, which is provided on the areas opposite one another in the swivelling direction of the ratchet 106 with an inner toothing 116 adapted to the outer toothing 103, which comprises one tooth each in the exemplary embodiment. Obviously, another number of teeth could also be provided, which is also true of the first exemplary embodiment.

As shown in FIG. 7, ratchet 106 differs from the ratchet 6 of the first embodiment, and includes bracket 106" which extends from the end section of ratchet 106 radial inwardly to driven shaft 102. Ratchet 106 is rotatably positioned on the inside of coupling cog 107 and is doubly offset in the direction to the end section of control lever 104, which is provided with slot 109. Carrier log 108, which engages in slot 109 is pressed out of bracket 106". Bracket 106" engages carrier cog 108 in the slot 109. Control lever 104 has an end section which is rotatably positioned on positioning pin 112. This end section lies, as shown in FIG. 7 and as in the first embodiment, between the driven gear 101 and the ratchet 106, on one side, and the swivelling lever 111 on the other side, which swivelling lever 111 is positioned rotatably on the driven shaft 102. Coupling cog 107 and the positioning cog 112 are set on swivelling lever 111.

Should the driven gear 101 which is arranged to the driven shaft so that it cannot turn, for example, be turned in the clockwise direction in the direction of the view, then the control lever 104 is moved in this rotational direction. As in the first embodiment, this movement first has the result of a swivelling movement about the positioning pin 112, because a tensioned spring seeks to hold the double-armed rotatable swivelling lever 111 positioned on the driven shaft 102 in the starting position as depicted in FIG. 6. This initial swivelling movement of the control lever 104 causes a swivelling movement of the ratchet 106 about the coupling cog 107 over the slot 109 and the carrier cog 108 in the counter-clockwise direction until the tooth 116 is completely engaged with the outer toothing 103 or the driven gear 101. Only after this does a further swivelling movement of the control lever 104 cause a positive rotational movement of the driven gear 101.

Within the swivelling range of the control lever 104 which is limited by the slot 114, an infinitely variable rotational movement of the driven gear 101 is possible, because the swivelling movement of the control lever 104 can be ended at any time. As in the first embodiment, the movement of the control lever 104 back into the starting position only results when the ratchet 106 disengages from the toothing 103 because the control lever 104 initially swivels the ratchet 106 necessarily in the opposing direction until it is lifted from the toothing of the driven gear 101 completely.

For further details of the second embodiment, reference is made to the first exemplary embodiment, because both embodiments function in the same way.

On the ratchet mechanism, a wrap spring brake 117 is installed on the side of the driven gear 101, which prevents the driven shaft 102 from tuning out in both rotational directions from the adjustment device to be driven, but is released by turning the driven gear 101 by means of the ratchet 106. Instead of this wrap spring brake 117, naturally a locking mechanism as that in the first embodiment can also be provided, since both are equivalent.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed:

1. Ratchet mechanism for driving adjustment devices for vehicle seats comprising:

a control lever that can be swivelled back and forth;

a ratchet movable by the control lever;

the ratchet cooperates with a gear ring of a driven gear;

gear means between the control lever and the ratchet which engages the ratchet with the gear ring in an initial range of the swivelling movement of the control lever and with further swivelling movement of the control lever, the ratchet moves on a track about the rotational axis of the driven gear while positively carrying the same as well as lift the ratchet from the gear ring in the starting area of the return stroke of the control lever.

2. Ratchet mechanism as recited in claim 1, wherein the ratchet has teeth pointing in opposing directions for an selectable rotational movement of the driven gear in one or the other rotational direction, from which the one engages with the gear ring with the movement of the control lever from the middle position to the one direction and the other engages with the gear ring with the movement of the control lever from the middle position to the opposing direction.

3. Ratchet mechanism as recited in claim 1, wherein the gear ring includes inner toothing in the form of a ring gear.

4. Ratchet mechanism as recited in claim 1, wherein the gear ring includes outer toothing and the ratchet has a section including the driven gear which is provided each with an inner toothing suited to the outer toothing in the areas facing each other in the ratchet swivelling direction.

5. Ratchet mechanism as recited in claim 1, wherein the swivelling axis of the control lever aligns with the rotational axis of the driven gear or runs parallel to it and a carrier element couples the ratchet with its swivelling axis as well as that of the control lever at a distance therefrom.

6. Ratchet mechanism as recited in claim 5, wherein the carrier element is arranged between the swivelling axes of the control lever and the ratchet.

7. Ratchet mechanism as recited in claim 6, wherein the carrier element is a cog parallel to the swivelling axes and provided on the control lever or on the ratchet, which is engaged with a slot in the ratchet or in the control lever.

8. Ratchet mechanism as recited in claim 1, wherein the ratchet is connected to one arm of a double-armed swivelling lever and the control lever is connected with the other arm of the double-armed swivelling lever which is positioned on the driven shaft such that they can swivel.

9. Ratchet mechanism as recited in claim 8, wherein the double-armed swivelling lever has cogs arranged diametrically to its swivelling axis which are conducted each into a slot concentric to the swivelling axis of the control lever which limit the swivelling range of the control lever.

10. Ratchet mechanism as recited in claim 9, wherein both cogs connect the control lever and the ratchet with the double-armed swivelling lever such that they can swivel.

* * * * *